United States Patent Office 3,417,815
Patented Dec. 24, 1968

3,417,815
PRESSURE EQUALIZING DEVICES SUITABLE FOR USE IN POWER-WATER REACTORS
Alexander van den Honert, Emmasingel, Eindhoven, Netherlands, assignor to North American Philips Company, Inc., New York, N.Y., a corporation of Delaware
Filed Oct. 4, 1966, Ser. No. 584,141
Claims priority, application Netherlands, Oct. 7, 1965, 6512979
4 Claims. (Cl. 165—107)

ABSTRACT OF THE DISCLOSURE

A pressure equalizing device for equalizing pressure fluctuations in a closed fluid circulating system, comprising a container having a lower portion connected by a first conduit to a portion of the system operating at a given pressure and providing the lower portion with a reservoir filling of the liquid, the upper portion is connected by a conduit to a second portion of the system operating at a lower pressure, a liquid heater is provided in the container and is positioned within the reservoir filling, the second conduit comprises a heat exchanger disposed within the lower container portion in the reservoir filling.

---

The invention relates to a pressure equalizing device for use in power-water reactors comprising a container capable of holding water and water vapour and being, in operation, in communication at its bottom with a first place of the primary circuit of the reactor, whilst the container portion capable of holding vapour can be caused to communicate via a control-member with a second place of the primary circuit, where a pressure prevails which deviates from the pressure prevailing at the first-mentioned place, whilst the container portion capable of holding water is provided with heating elements.

A pressure equalizing device of the kind set forth is known. This device is employed for holding the pressure of the water in the primary circuit of a power-water reactor within given limits. If, for example, due to a change of the heat transfer to the water in the primary circuit the temperature of the water in said circuit changes, the density of the water will also vary. The resultant volume and pressure variations have to be compensated by the pressure equalizing device and held within the predetermined limits.

If the density of the water decreases, the pressure in the pressure equalizing vessel will increase. In order to counteract this rise in pressure, the known pressure equalizing device is provided with one or more nozzles arranged in the vapour space, which nozzles inject water from the primary circuit into the vapour space when a given pressure is attained. This water is colder than the vapour contained in the pressure equalizing device, so that the vapour condenses, so that a further rise in pressure is avoided.

If, on the contrary, the density of the water in the primary circuit increases, water will flow out of the pressure equalizing device due to the resultant diminution of volume, which is attended with a drop of pressure. This drop of pressure is counteracted by the evaporation of a quantity of water. However, it has been found that in the case of a sequence of inflows and outflows the pressure attained at the end of an outflow is gradually lower so that after a restricted number of inflows and outflows the pressure drops below the desirable minimum pressure. This is due to the fact that the temperature of the water becomes too low.

The invention has for its object to obviate said disadvantage. The device according to the invention is characterized in that the communication between the container portion capable of holding vapour and the primary circuit passes through the container portion capable of holding water and is constructed at least partly as a heat exchanger, said communication joining a place of the primary circuit where the pressure is lower than the pressure at the said first place communicating with the water space.

If the density of the water in the primary circuit decreases, water will flow into the pressure equalizer so that a rise in pressure is produced. When a given pressure is attained, the communication between the vapour space and the primary circuit is released. Then vapour can flow from the pressure equalizer to the primary circuit. The vapour is in thermal contact with the water in the pressure equalizer. If the water is colder than the vapour, which will be the case with a sequence of inflows and outflows to an increasing extent, the vapour will give off heat to the water. Thus the vapour condenses. As a result the temperature of the water remains high.

At a subsequent increase in density of the water in the primary circuit the water in the pressure equalizer will have a higher temperature so that the drop of pressure will be considerably smaller than in the known devices of the kind set forth.

The device according to the invention has the advantage that the heat exchange between the vapour conducted away from the vessel and the water is improved according as the temperature of the water is lower. This means that at a sequence of inflows and outflows a state of equilibrium will be established, in which the minimum pressure has a constant value. This will be explained more fully in the following description of the figures.

The pressure equalizer according to the invention exhibits a considerably better heat economy than the known devices.

Since the dimensions and the characteristic operation of this kind of devices depend completely upon said heat economy, it will be obvious that the device according to the invention may have smaller dimensions and exhibits an improvement in operation as compared with the known devices.

In a further advantageous embodiment of the device according to the invention the heating elements are arranged at a distance above the bottom of the vessel, whilst the heat exchanger is split up into a portion located above said elements and a portion located below said elements.

This has the advantage that already at the first inflow the suction vapour can condense in the heat-exchanger portion located beneath the heating elements. Afterwards condensation takes place mainly in the heat-exchanger portion located above the heating elements, whereas in the other portion of the heat exchanger the resultant condensate may be under cooled.

A further advantage of this embodiment consists in that by disposing the heating elements high in the vessel these elements are not struck by the inflow of cold water, but come into contact with water of a higher temperature, so that the elements provide water boiling sooner.

In a further embodiment a control-member is arranged in the communication between the container portion intended for vapour and the primary circuit at a place located between the heat exchanger and said second place, where the communication opens out in the primary circuit. This has the advantage that this control-member is traversed only by the condensate so that no difficulties in the control due to two phases (water and vapour) will occur.

The control of the power of the heating elements in the known devices of the kind according to the invention is performed by means of pressure-sensitive elements, which reduce the power at a pressure exceeding the nominal pressure and increase the power at a pressure below the nominal pressure.

By disposing the heating elements higher in the container in accordance with the invention it is achieved that at the place of said elements the temperature varies between the temperature of the primary circuit and the higher temperature in the container portion located above the elements. During the inflows and the outflows the profile shifts slightly upwards or downwards respectively.

According to the invention one or more temperature pick-ups are provided at the place of the heating elements for recording the mean temperature across the heating elements, the power of the heating elements being thus controlled in accordance with the temperature measured. The control of power as a function of the temperature has the advantage that at an inflow a lower temperature is measured so that the power is raised. The water is thus already heated so that at the subsequent outflow the water temperature will be higher and the decrease in pressure will be smaller.

The invention will be described more fully with reference to the drawing.

Figure 1:
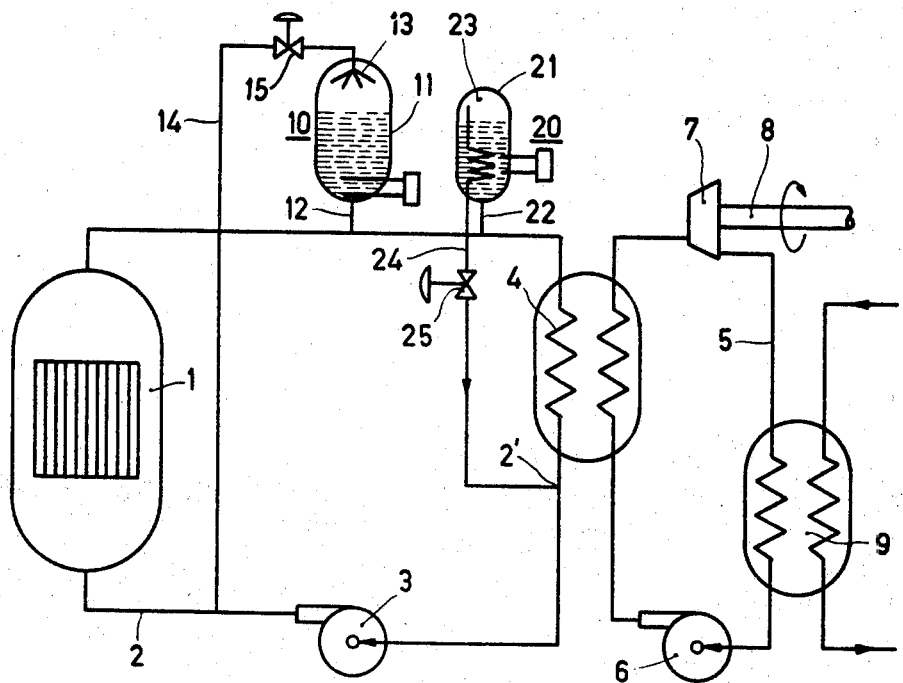
FIG. 1 shows diagrammatically, not to scale, a power-water reactor system, the figure showing one of the possibilities of arranging the pressure equalizing device of the type in which vapour is blown off. This figure shows furthermore diagrammatically a pressure equalizing device of the known nozzle type.

Referring to FIG. 1, reference numeral 1 designates a reactor. The reactor is included in a primary circuit 2 in which cooling water is caused to circulate by means of a pump 3. The primary circuit includes furthermore a heat exchanger 4. The cooling water absorbs heat from the reactor and gives off this heat in the heat exchanger 4 to a medium, which is caused to circulate in a secondary circuit 5 by means of a pump 6. The secondary medium evaporates in the heat exchanger 4. The vapour expands in a turbine 7, the outgoing shaft 8 of which is linked to an implement to be driven, for example a ship's screw or a generator. The expanded medium is then condensed in a condenser 9.

If the power supplied by the turbine is subjected to fluctuations, the consumption of heat in the heat exchanger 4 will also fluctuate. The consumption of heat fluctuates with much greater speed than the possible speed of control of the reactor. This means that temporarily an excessive quantity or a deficit quantity of heat has to be stored in the primary medium, which involves density variations and hence volume and pressure variations. In order to hold the pressure variations within given limits, the primary circuit communicates with a pressure equalizer.

Reference numeral 10 designates a known pressure equalizer. This known device comprises a vessel 11, which communicates at its lower side through a duct 12 with the primary circuit. Above in the vessel 11 there is provided a nozzle 13, which communicates through a duct 14 with the primary circuit. The duct 14 includes a control-cock 15. The pressure in the primary circuit at the place of connection with the duct 12 is lower than the pressure at the place of connection of the duct 14 with the primary circuit.

When at a decrease of heat consumption in the heat exchanger 4 the density of the water in the primary circuit decreases, water will flow into the container 11, which involves a rise in pressure. When a given pressure is attained, the cock 15 opens and colder water is injected by the nozzle 13 into the vapour space. Part of the vapour condenses on the water drops so that the pressure will not increase further.

Figure 3:
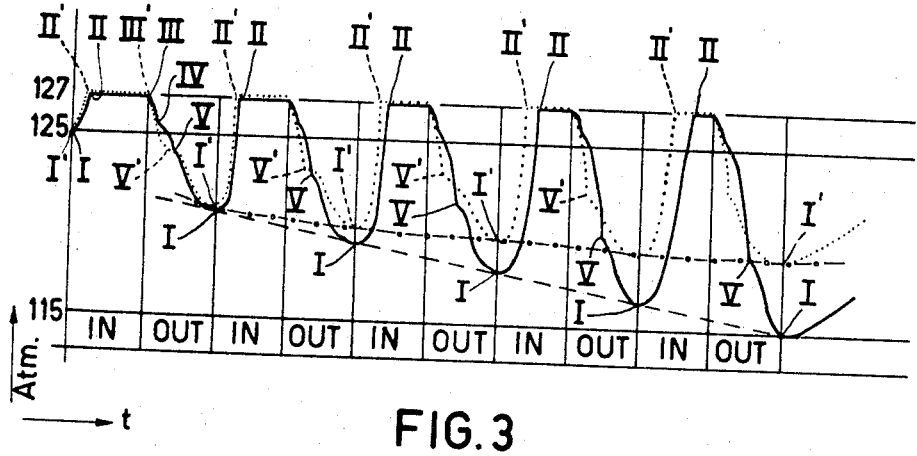
FIG. 3 illustrates the pressure variation with a number of consecutive inflows and outuows of water both for a pressure equalizer comprising a nozzle and a pressure equalizer comprising a heat exchanger.

At an increase in heat consumption in the heat exchanger 4 the density of the water in the primary circuit will increase. Owing to the diminution of the volume water will flow out of the container 11 back into the primary circuit, so that the pressure in the container 11 drops. At a drop of pressure, however, a quantity of water will evaporate. It has been found that with a sequence of inflows and outflows the final pressure at the last outflow period is gradually lower. This is due to the fact that the water in the container grows gradually colder. FIG. 3 illustrates the pressure variation in this known pressure equalizer by a full line. The nominal pressure is chosen to be 125 ata., and the maximum and minimum pressures are assumed to be 127 ata. and 125 ata. respectively.

In the first period water flows into the container 11, so that the pressure varies from point I to point II (127 ata.). At this point the cock 15 is opened and spraying is started. The pressure then remains constant up to point III at the end of the first inflow.

Then an outflow period follows, in which at point IV the upper layer of saturated water formed by spraying starts boiling. At V the remainder of the water also starts boiling. The termination of this period is again indicated by point I. From the figure it will be apparent that this point I is located at a gradually lower pressure. The line of connection between said points does not have a flat course and after a few inflows and outflows the pressure will even drop below the permissible lower limit.

The difficulty involved in this gradually decreasing pressure is obviated by using a pressure equalizer 20 according to the invention.

This equalizer comprises a container 21, which communicates on its lower side through a duct 22 with the primary circuit. The vapour space 23 communicates through a duct 24 with a place 2' in the primary circuit where a lower pressure prevails than at the place where the duct 22 opens out in said circuit. The duct 24 includes a control-cock 25. FIG. 1 illustrates a possibility of arranging the device 20, but other dispositions are also possible.

Figure 2:
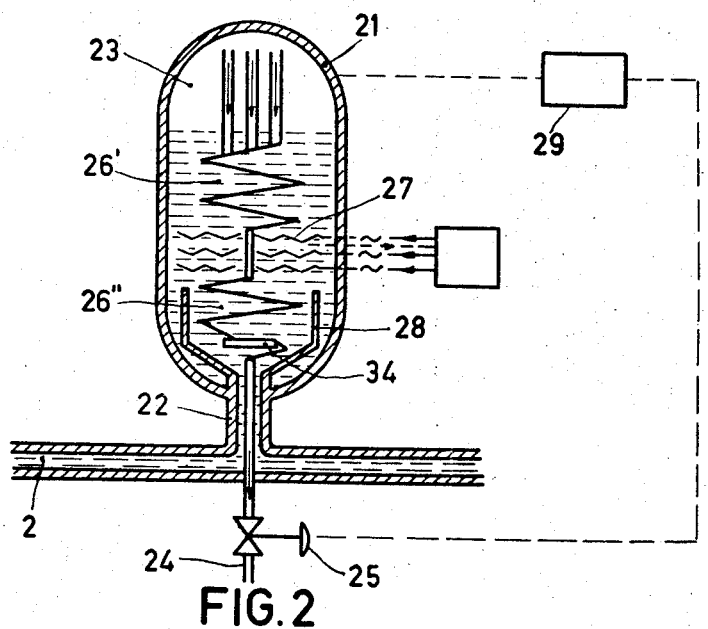
FIG. 2 shows diagrammatically and not to scale further details of a pressure equalizing device of the type in which vapour is blown off.

FIG. 2 illustrates diagrammatically on an enlarged scale further details of the pressure equalizer 20. From this figure it will be seen that the duct 24, establishing the communication between the primary circuit and the vapour space 23, passes through the water space. Part of said duct is constructed as a heat exchanger 26. This heat exchanger is split up into an upper portion 26' and a lower portion 26". Between these two portions are arranged the heating elements 27. The latter may be electric heating elements. The container 21 comprises furthermore a thermal screen 28 and a flow breaking plate 34, which ensure that the water flowing in from the primary circuit mixes only to a slight extent with the water of the container 21. The arrangement comprises furthermore a control-member 29, which opens the cock 25 when the pressure attains the given maximum pressure.

The operation of this arangement will be explained further with reference to FIG. 3, in which the pressure variation involved in this arrangement is indicated by a broken line. When during the first period water flows into the container 21, the pressure will increase from point I'. When the maximum pressure is attained (127 ata.) at point II", the cock 25 is opened. Vapour can then flow out of the space 23. The vapour thus passes along the heat exchanger 26. In this first period the vapour can be only slightly hotter than the water above the heating elements 27, so that heat exchange will take place mainly in the portion 26". The vapour condenses in said portion. If not all the vapour is condensed in the portion 26" of the heat exchanger, further condensation is performed in the portion of the duct 24, which extends further through the primary circuit. This portion may be extended at will. In the second period (outflow of water) the pressure drops from point III'. At point V' the line exhibits a given discontinuity, since the water starts boiling and at the end of the second period point I' is attained. Then again an inflow follows. Due to the inflow the water above the heating elements will become slightly colder so that already in this period the outflowing vapour can give off heat also in the portion 26' of the heat exchanger. The water in the container 21 thus assumes a higher temperature, so that it will start boiling earlier. This becomes manifest in the fourth (second outflow) period in that point V' is at a higher level than point V (in nozzle operation).

Consequently, vapour is developed earlier at a higher pressure and this results in a higher position of point I'. This tendency is continued during the further periods. The heat exchange between vapour and water in the portion 26' of the heat exchanger gradually improves according as the temperature of the water above the heating elements drops; in the portion 26" of the heat exchanger subcooling of the condensate will take place. Due to the gradually improving heat exchange the line of connection between the points I' will have a gradually flatter course so that a state of equilibrium is obtained, in contrast to the line of connection between the points I, which descends more and more. Consequently, the device according to the invention permits of maintaining a pressure within given limits irrespective of the number of consecutive inflows and outflows.

Since the thermal economy in the device according to the invention is materially better than in devices comprising a nozzle, a device comprising a heat exchanger may have, apart from its improved operation, smaller dimensions.

The dimensions may furthermore be reduced by the fact that the volume of the vapour space 23 is allowed to drop to zero theoretically. If a nozzle is used, there is always required a given volume for the spraying nozzle with respect to the minimum sojourn of each drop for assuming the ambient temperature.

A further factor for reducing the dimensions is that expansion of sprayed water, that is to say a form of inflow, does not occur whereas even shrinkage occurs when condensate is sucked off to the primary circuit.

The heat exchanger does not form a factor causing increase in volume, since the water in the heat exchanger and the latent heat of the material of the heat exchanger normally take part in the process of vapour development. The walls of the heat exchanger may be very thin.

The disposition of the heating elements at a given distance from the bottom has the advantage that these elements art not struck by colder water from the primary circuit, but that they are touched by water of considerably higher temperature. A further advantage of this arrangement is that the power of the heating elements can now be controlled satisfactorily in accordance with the mean temperature measured at the place of said elements.

Figure 4:
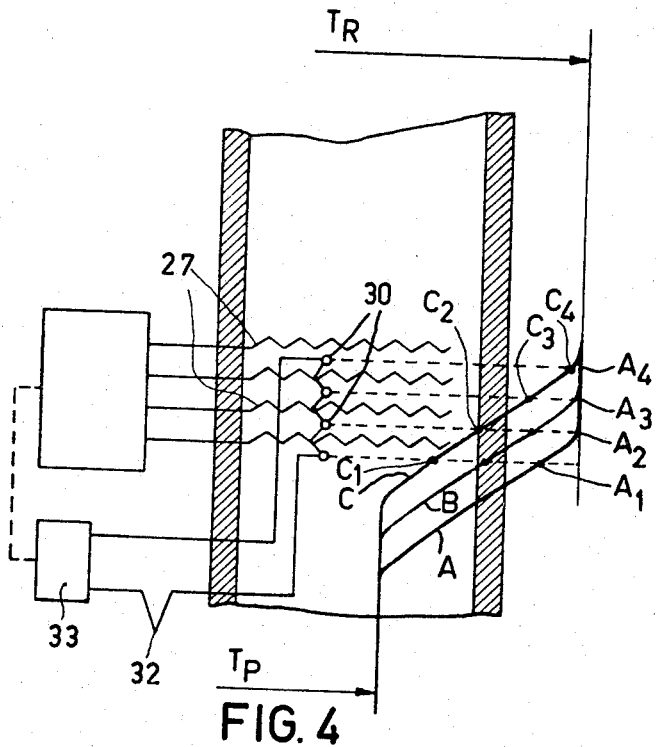
FIG. 4 illustrates diagrammatically the control of the power of the heating elements.

FIG. 4 shows diagrammatically the part of the container 21 in which the heating elements 27 are arranged. At the place of the heating elements four series-connected thermo-elements 30 are accommodated, by way of example. The cold junctions of these thermo-elements are designated by 32. The thermo-voltage of the thermo-elements is measured in the device 33, which converts this voltage in known manner into a magnitude controlling the supply of energy to the heating elements 27.

FIG. 4 illustrates furthermore the course of the temperature in the container 21. Below the heating elements the water has a temperature $T_p$, for example 270° C., equal to the temperature of the water in the primary circuit. Above the heating element the temperature is $T_R$ associated with the pressure desired for the circuit. Between these temperatures the temperature may fluctuate as is indicated by the profile A. The thermo-elements provide a common voltage, which is the sum of the voltages due to the temperatures $A_1$, $A_2$, $A_3$ and $A_4$.

At this comparatively high temperature the control-member 33 will regulate the heating elements so that low power is provided.

At an inflow, that is to say of colder water, the temperature profile will shift upwardly, for example via the profile B to the profile C. In this condition the thermo-elements provide a voltage which is the sum of the voltages associated with the temperatures $C_1$, $C_2$, $C_3$ and $C_4$. This voltage is lower than that of the profile A, so that the control-member will govern the heating elements so that their power is raised. The water in the container 21 will thus be heated without the development of vapour, so that due to this heating substantially no increase in pressure is produced. At the subsequent outflow the water will develop vapour already at a higher pressure, so that the drop of pressure during the outflow will be smaller than in the control of the heating elements in accordance with the measured pressure.

This temperature-dependent control is possible when the temperature profile shifts at least to some extent uniformly in a direction of height in the container. This is the case when the heating elements are arranged at a given distance above the bottom.

What is claimed is:

1. A pressure equalizing device suitable for equalizing pressure fluctuations in a substantially closed fluid circulating system, comprising a container having a lower portion and an upper portion, first conduit means for connecting said lower portion to a first portion of said system operating at a given pressure and providing said lower portion with a reservoir filling of said liquid, second conduit means for connecting said upper portion to a second portion of said system operating at a pressure lower than said given pressure, liquid heating means in said container and positioned within the said reservoir filling thereof, said second conduit means comprising a portion disposed within said lower container portion within said reservoir filling and comprising heat exchanging means in thermal contact with the liquid of said reservoir filling.

2. A pressure equalizing device as claimed in claim 1 wherein said liquid heating means comprises an electrical heating element arranged at a given distance above the bottom of said container, and said heat exchanging means comprises a first heat exchanger portion arranged below said heating element and a second heat exchanger portion arranged above said heating element.

3. A pressure equalizing device as claimed in claim 1 further comprising a control member interposed in said second conduit means at a point between the said connection to the upper portion of said container and the said second portion of said system.

4. A pressure equalizing device as claimed in claim 1 further comprising temperature responsive means arranged in thermal contact with said liquid heating means, and control means energized by said temperature responsive means for activating said heating means.

References Cited

UNITED STATES PATENTS

| | | | |
|---|---|---|---|
| 3,060,110 | 10/1962 | Wainrib | 176—50 |
| 3,114,414 | 12/1963 | Judd | 176—65 |
| 3,212,565 | 10/1965 | Esleeck | 122—32 |
| 3,305,002 | 2/1967 | Leonard et al. | 165—31 |

BENJAMIN R. PADGETT, *Primary Examiner.*

H. E. BEHREND, *Assistant Examiner.*

U.S. Cl. X.R.

176—50, 65